US008850302B2

(12) United States Patent
Nagao

(10) Patent No.: US 8,850,302 B2
(45) Date of Patent: Sep. 30, 2014

(54) INFORMATION PROCESSING APPARATUS AND METHOD THEREOF FOR GENERATING DRAWING DATA OF A MOVING IMAGE OBJECT IN A RASTER FORMAT FOR PRINTING AN IMAGE BASED ON A WEB PAGE BY A PRINTING APPARATUS IF IT IS DETERMINED THAT THE WEB PAGE CONTAINS THE MOVING IMAGE OBJECT AND DRAWING DATA OF THE MOVING IMAGE OBJECT CANNOT BE CREATED IN THE VECTOR FORMAT

(75) Inventor: Keisuke Nagao, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 108 days.

(21) Appl. No.: 13/161,715

(22) Filed: Jun. 16, 2011

(65) Prior Publication Data
US 2012/0017142 A1 Jan. 19, 2012

(30) Foreign Application Priority Data

Jul. 16, 2010 (JP) ................................ 2010-162210

(51) Int. Cl.
G06F 17/30 (2006.01)
(52) U.S. Cl.
CPC .............................. G06F 17/30843 (2013.01)
USPC .......................................... 715/211; 715/719
(58) Field of Classification Search
USPC .................................................. 715/211, 719
See application file for complete search history.

(56) References Cited

U.S. PATENT DOCUMENTS

| 5,388,166 | A   | * | 2/1995  | Onozawa ...................... 382/269 |
| 6,360,234 | B2  | * | 3/2002  | Jain et al. ...................... 715/201 |
| 6,734,986 | B1  | * | 5/2004  | Kuroi et al. .................. 358/1.16 |
| 7,062,705 | B1  | * | 6/2006  | Kirkwood et al. ............ 715/205 |
| 7,076,495 | B2  |   | 7/2006  | Dutta et al. |
| 7,253,919 | B2  | * | 8/2007  | Hull et al. .................... 358/1.18 |
| 7,542,720 | B2  | * | 6/2009  | Yoda et al. ................... 455/41.1 |
| 7,808,511 | B2  | * | 10/2010 | Opala et al. .................. 345/619 |
| 7,962,525 | B2  | * | 6/2011  | Kansal .......................... 707/802 |
| 8,429,005 | B2  | * | 4/2013  | Mannik et al. ............... 705/14.1 |
| 8,713,425 | B2  | * | 4/2014  | Reams .......................... 715/234 |
| 2007/0046982 | A1 | * | 3/2007  | Hull et al. ..................... 358/1.15 |
| 2009/0037384 | A1 | * | 2/2009  | Ono ................................. 707/3 |
| 2009/0063314 | A1 | * | 3/2009  | Wang et al. ..................... 705/30 |
| 2010/0123908 | A1 |   | 5/2010  | Denoue et al. |

FOREIGN PATENT DOCUMENTS

EP 2202630 A 6/2010
JP 2000-181924 6/2000

OTHER PUBLICATIONS

A. Girgensohn and J. Boreczky; "Time-Constrained Keyframe Selection Technique;" 1999; IEEE Multimedia Systems 99, IEEE Computer Society, V. 1, 756-761.*
Mike Doughty; "Two Kinds of Computer Graphics;" Dec. 6, 1999; Mike's Sketchpad; pp. 1-2.*

(Continued)

Primary Examiner — Andrew Dyer
(74) Attorney, Agent, or Firm — Fitzpatrick, Cella, Harper & Scinto

(57) ABSTRACT

If a web page contains a moving image object, an information processing apparatus generates drawing data of the moving image object in a raster format and creates captured data by incorporating the generated drawing data of the moving image object into drawing data of the web page generated in a vector format.

25 Claims, 8 Drawing Sheets

(56) References Cited

OTHER PUBLICATIONS

European Search Report, Application No. EP 11 00 5038.2 dated Jun. 28, 2013, 6 pages including cover sheet, unnumbered 1 page European Search Report, unnumbered 1 page Annex to European Search Report, and sheets 1-3 of discussion of cited references attached to European Search Report.

* cited by examiner

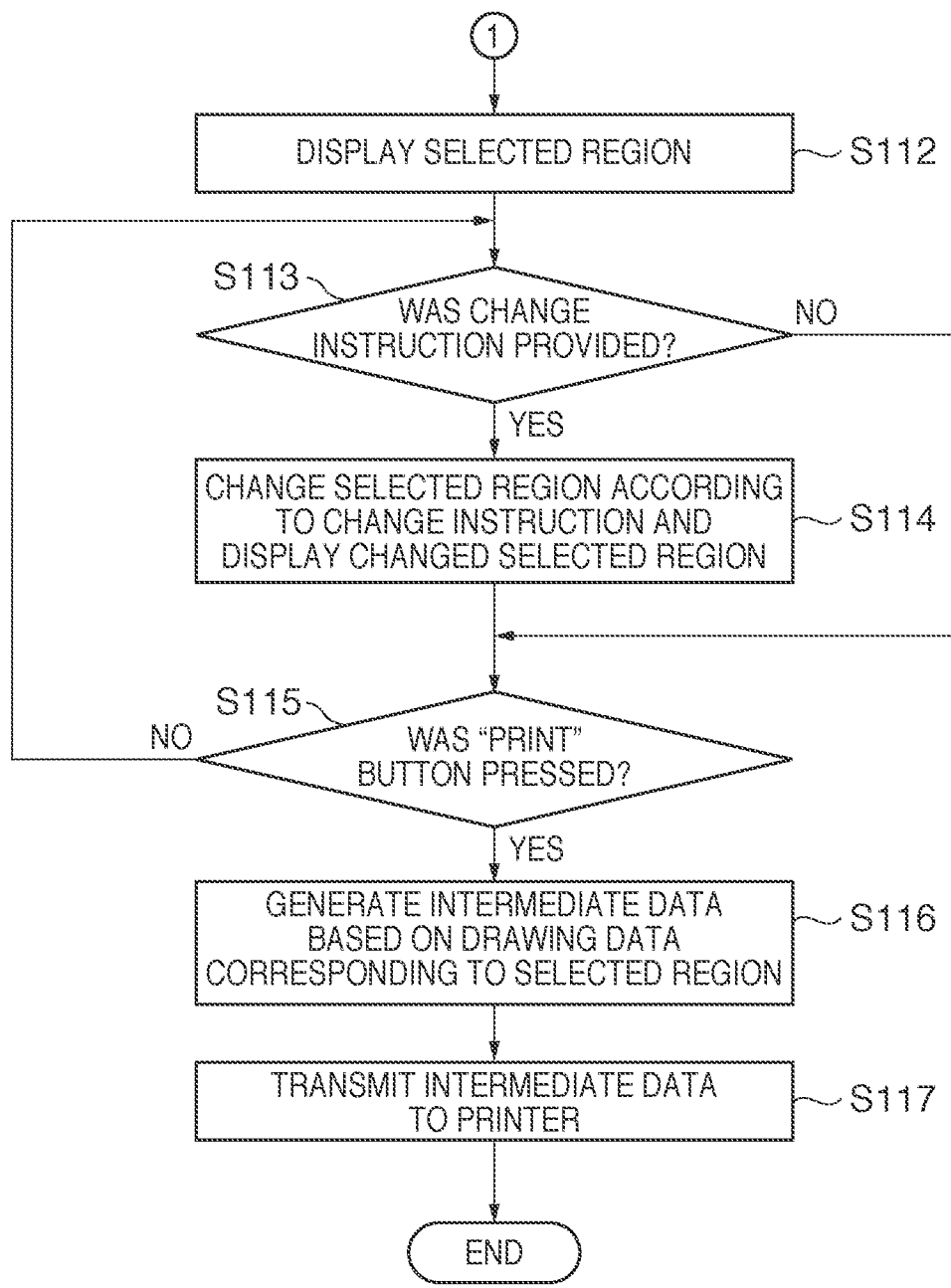

INFORMATION PROCESSING APPARATUS AND METHOD THEREOF FOR GENERATING DRAWING DATA OF A MOVING IMAGE OBJECT IN A RASTER FORMAT FOR PRINTING AN IMAGE BASED ON A WEB PAGE BY A PRINTING APPARATUS IF IT IS DETERMINED THAT THE WEB PAGE CONTAINS THE MOVING IMAGE OBJECT AND DRAWING DATA OF THE MOVING IMAGE OBJECT CANNOT BE CREATED IN THE VECTOR FORMAT

BACKGROUND OF THE INVENTION

1. Field of the Invention

The present invention relates to an information processing apparatus configured to process a moving image object, a processing method of the information processing apparatus, and a non-transitory computer-readable storage medium.

2. Description of the Related Art

Conventionally, web pages composed of a structured document written in a structured language such as HTML (Hyper Text Markup Language), XHTML (Extensible Hyper Text Markup Language), or the like have been known. In addition, it has been known that software called a web browser is used to reference web pages.

A technology for extracting a required portion within a web page displayed in a web browser and printing the extracted required portion has been known. Moreover, a technology for selecting a desired still image from a plurality of still images constituting a moving image on a web page and printing the selected desired still image has also been known (see Japanese Patent Laid-Open No. 2000-181924).

Moving image objects contained in web pages are divided into objects whose drawing data can be captured in a vector format and objects whose drawing data cannot be captured in the vector format.

In printing a web page, in the case where the image quality of characters and the like is of a great importance, it is preferable to capture the web page itself in the vector format. However, if the web page contains a moving image object that cannot be captured in the vector format, this moving image object portion will not be captured and will be missing.

SUMMARY OF THE INVENTION

The present invention provides a technology by which any moving image object portion can be captured and will not go missing even if it is a moving image object that cannot be captured in the vector format.

According to a first aspect of the present invention there is provided an information processing apparatus comprising: a determination unit configured to determine whether a web page contains a moving image object; a generation unit configured to generate drawing data of the moving image object in a raster format if the determination unit has determined that the web page contains the moving image object; a creation unit configured to create captured data by incorporating the drawing data of the moving image object generated by the generation unit into drawing data of the web page generated in a vector format; and an output unit configured to output the captured data created by the creation unit.

According to a second aspect of the present invention there is provided a processing method of an information processing apparatus that can process a web page, the method comprising: determining whether a web page acquired by the information processing apparatus contains a moving image object; generating drawing data of the moving image object in a raster format if it has been determined that the web page contains the moving image object; creating captured data by incorporating the generated drawing data of the moving image object into drawing data of the web page generated in a vector format; and outputting the created captured data.

Further features of the present invention will be apparent from the following description of exemplary embodiments with reference to the attached drawings.

BRIEF DESCRIPTION OF THE DRAWINGS

The accompanying drawings, which are incorporated in and constitute a part of the specification, illustrate an embodiment of the invention, and together with the description, serve to explain the principles of the invention.

FIG. 9 is a flowchart illustrating an example of the flow of processing in the PC 10 shown in FIG. 1.

DESCRIPTION OF THE EMBODIMENTS

An exemplary embodiment of the present invention will now be described in detail with reference to the drawings. It should be noted that the relative arrangement of the components, the numerical expressions and numerical values set forth in this embodiment do not limit the scope of the present invention unless it is specifically stated otherwise.

Note that a "printing medium" means not only a paper sheet for use in a general printing apparatus but also a member which can fix ink, such as cloth, plastic film, metallic plate, glass, ceramics, resin, lumber, or leather in a broad sense.

Figure 1:
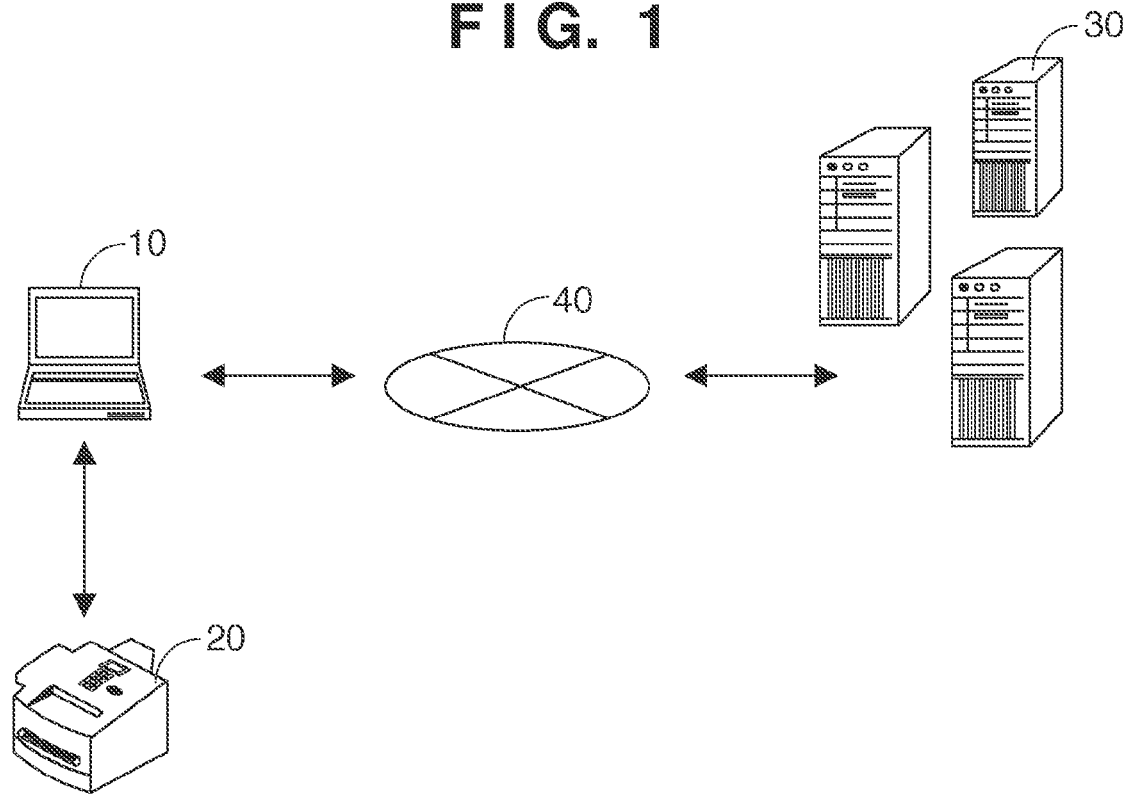
FIG. 1 is a diagram showing an example of the configuration of a printing system according to an embodiment of the present invention.

FIG. 1 is a diagram showing an example of the configuration of a printing system according to an embodiment of the present invention.

The printing system includes a personal computer (hereinafter simply referred to as a "PC") 10, a printer 20 connected to the PC, and a plurality of WWW servers 30 connected to the PC via the Internet 40. A communicable connection is established between the PC 10 and the printer 20 using, for example, a LAN (Local Area Network), a USB (Universal Serial Bus), or the like. It should be noted that the overall configuration illustrated here is merely an example, and for example, a plurality of PCs 10 and a plurality of printers 20 may be provided, or an apparatus other than these may be connected.

The PC 10 is an information processing apparatus, which is handled by a user. The PC 10 downloads a web page from a WWW server 30 via the Internet 40 and displays the downloaded web page. Examples of the web page include those composed of a structured document written in HTML, XHTML, XML, or the like and acquired via the Internet 40. A structured document refers to a document written in a structured description language (e.g., a markup language) that defines the structure of a document. It should be noted that the PC 10 can handle any such document as a web page as long as a display screen can be created based on the document, even if it is not acquired via the Internet 40. Moreover, the PC can handle various types of content as web pages as long as the content is in a format that can be handled by a web browser (hereinafter simply referred to as a browser), even if the content is in a format other than the structured document formats. Moreover, after acquiring a web page via the browser, the PC 10 can also instruct the printer 20 to print the web page.

The printer 20 is a printing apparatus that performs printing by forming an image on a printing medium (e.g., paper) using a printing agent (ink, toner, or the like). It should be noted that there is no particular limitation to the printing method of the printer 20. For example, an inkjet method may be used, or an electrophotographic method may be used.

The WWW servers 30 store web pages written in HTML, XHTML, or the like, images, and the like and provide the stored information via the Internet 40 in response to a request from the PC 10 or the like.

Figure 2:
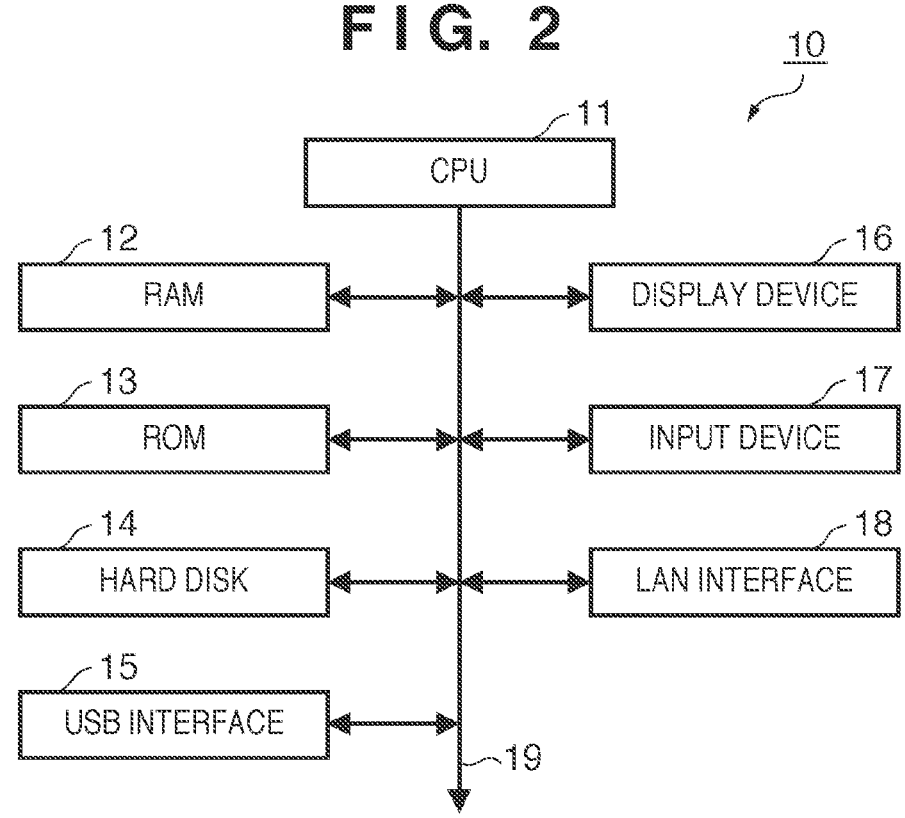
FIG. 2 is a diagram showing an example of a hardware configuration of a PC 10 shown in FIG. 1.

Next, an example of a hardware configuration of the PC 10 shown in FIG. 1 will be described using FIG. 2.

The PC 10 includes a CPU 11, a RAM 12, a ROM 13, a hard disk 14, a USB interface 15, the display device 16, an input device 17, and a LAN interface 18. It should be noted that these units constituting the PC 10 are communicably connected to each other via a bus 19.

The CPU 11 conducts integrated control of operations in the PC 10. More specifically, the CPU 11 performs calculations and the like of data or instructions in accordance with programs stored in the ROM 13, the hard disk 14, or the like.

The RAM 12 is used as a work area when the CPU 11 performs various types of processing. The hard disk 14 stores an operating system (OS), a browser, other types of application software, and the like.

The USB interface 15 is an interface through which a USB device is connected, and is used to perform data communication with, for example, the printer 20. The LAN interface 18 is an interface for connecting the PC 10 to a LAN and is used to perform data communication with, for example, a WWW server 30 via the Internet 40. It should be noted that data communication using the USB interface 15 and using the LAN interface 18 can be performed by wired transmission or by wireless transmission.

The display device (a display) 16 is, for example, a CRT, a liquid crystal display, or the like and displays various types of screens (e.g., a web page, a print preview image, and a graphical user interface (GUI)) based on information and the like downloaded from a WWW server 30. The input device 17 is, for example, a mouse, a keyboard, or the like and is used to input instructions from the user.

Figure 3:
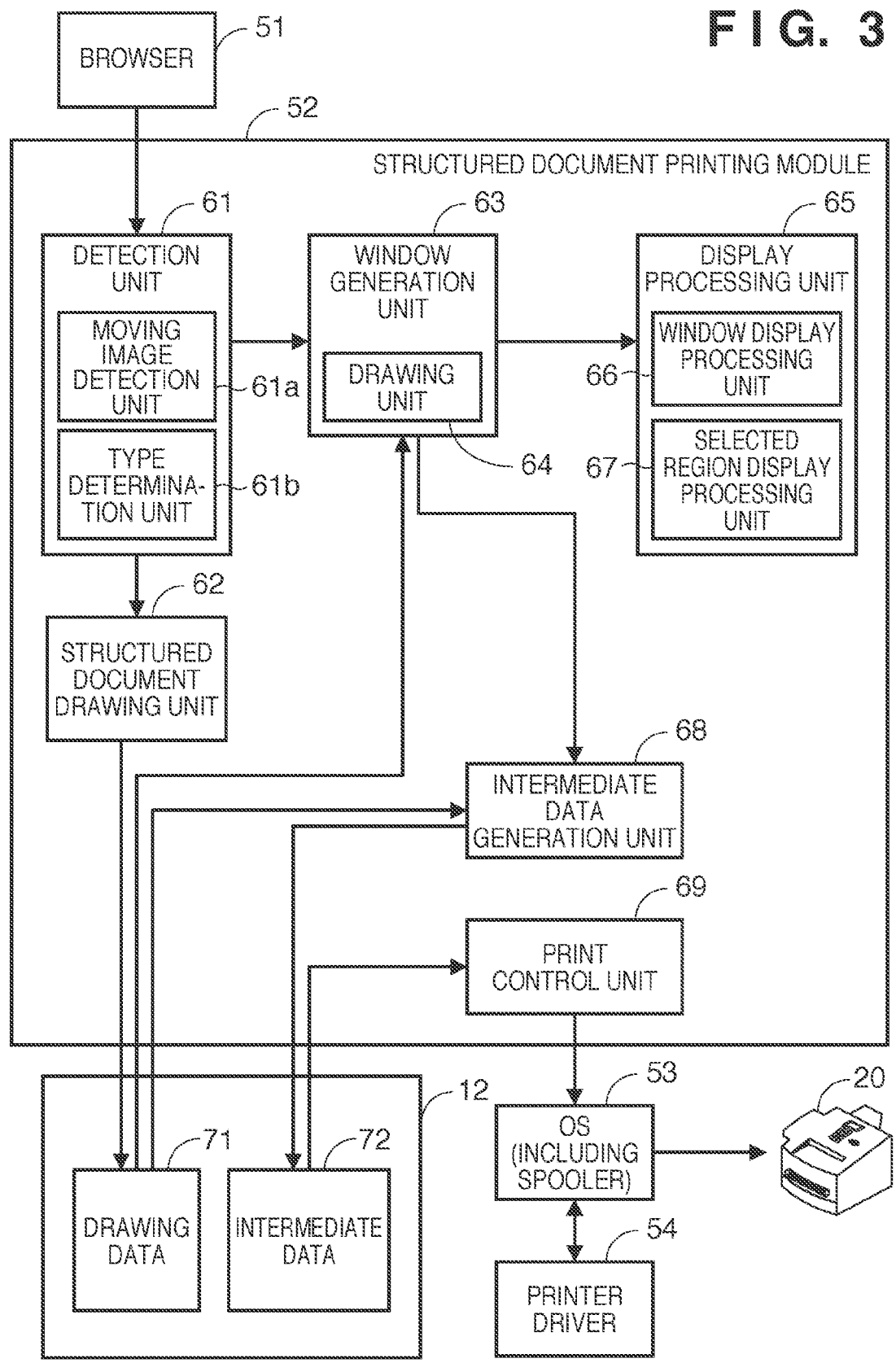
FIG. 3 is a diagram showing an example of a functional configuration implemented on the PC 10.

Next, an example of a functional configuration implemented on the PC 10 will be described using FIG. 3. It should be noted that a functional configuration implemented in a structured document printing module 52 can be implemented by, for example, the CPU 11 executing a program (e.g., the structured document printing module) that has been read out from the ROM 13 using the RAM 12 as a work area.

Here, a browser 51 is an application that analyzes a web page and displays the web page according to the result of the analysis. Moreover, the browser 51 downloads a web page on a WWW server 30 to the hard disk 14 of the PC 10 and displays the downloaded web page on the display device 16.

As described above, a web page contains a structured document written in a structured language such as HTML, XHTML, or the like, and elements constituting the structured document, such as text, images, and the like, are described using tags. Moreover, a separate file called a style sheet (CSS: Cascading Style Sheet) that defines the display style of these elements is designated in the structured document. The browser 51 can analyze such structured documents and display them on the display device 16. It should be noted that a general-purpose browser can be used as the browser 51.

The structured document printing module 52 is a piece of plug-in software invoked from the browser 51. For example, in the case where the user has designated a print region to the browser 51, this structured document printing module 52 will be executed. Once an installer for installing the structured document printing module 52 has been activated, the module 52 is saved in the hard disk 14. Then, a menu or the like for invoking the structured document printing module 52 or designating various types of functions of the module 52 is incorporated into the browser 51.

Here, with regard to a functional configuration of the structured document printing module 52, the module includes a detection unit 61, a structured document drawing unit 62, a window generation unit 63, a display processing unit 65, an intermediate data generation unit 68, and a print control unit 69.

The detection unit 61 includes a moving image detection unit 61*a* that analyzes a web page (a structured document) to detect a moving image object and a type determination unit 61*b* that further determines the type of the moving image object if the moving image object has been detected.

The structured document drawing unit 62 generates drawing data 71 based on the result of parsing the web page. It should be noted that in the case where a moving image object has been detected by the detection unit 61, different drawing processing is performed for each type of moving image object. Moreover, the structured document drawing unit 62 generates the drawing data (drawing data in a vector format or a raster format) 71 for the moving image object at constant time intervals on the RAM 12. In the case where drawing data in the vector format and drawing data in the raster format have been generated, the structured document drawing unit 62 combines the drawing data in these different formats. In drawing data in the vector format, for example, characters are expressed as character codes and codes that indicate the font type and the like, and line drawings are expressed as codes that indicate direction, distance, and the like.

The window generation unit 63 generates a print preview window (a child window) for displaying the drawing data 71 stored in the RAM 12. A drawing unit 64 that draws the drawing data 71 generated on the RAM 12 on the child window is provided within the window generation unit 63. It should be noted that the drawing unit 64 updates data corresponding to the moving image object in the drawing data as required based on the drawing data generated by the structured document drawing unit 62 at constant time intervals, and draws the updated data on the child window. Thus, on the child window, the moving image object portion is updated as required, and therefore the moving image object is displayed in a playback (movement) state in which it is being played back. It should be noted that the child window has the same size as, for example, a display region of the browser 51.

The display processing unit 65 allows various types of screens to be displayed on the display device. The display processing unit 65 displays various types of information on the display device 16 in accordance with drawing data supplied to a display driver. A window display processing unit 66 and a selected region display processing unit 67 are provided within the display processing unit 65. The window display processing unit 66 allows the child window that has been generated by the window generation unit 63 to be displayed in front of the display region of the browser 51. The selected region display processing unit 67 allows a selected region that defines a print range to be displayed on the child window. In the case where a change in the size or the like of the selected region has been instructed by the user, the selected region display processing unit 67 changes the range of the selected region in accordance with the change instruction and displays the changed selected region.

The intermediate data generation unit 68 retrieves data corresponding to the selected region displayed by the selected region display processing unit 67 from the drawing data 71 generated by the structured document drawing unit 62, and generates intermediate data 72 based on the retrieved data. The intermediate data 72 is data into which data in the vector format, data in the raster format, and text data are integrated. It should be noted that the intermediate data can be in any data format as long as it can be interpreted by the printer 20. For example, the intermediate data can be generated in EMF (Enhanced Meta File) format. The intermediate data may also be in PDF (Portable Document Format) format or in XPS (XML Paper Specification) format. With regard to the method for creating intermediate data in PDF and in XPS, a commonly-used technology is employed as is the case with EMF.

The print control unit 69 controls printing based on the intermediate data 72 generated by the intermediate data generation unit 68. More specifically, this unit causes a printer driver 54 to perform drawing processing of the intermediate data 72 via the OS 53.

The OS 53 provides various types of APIs (Application Programming Interfaces). Examples of the APIs include the GDI (Graphics Device Interface) used in Windows (registered trademark) of Microsoft Corporation in the U.S., a specialized graphics API, and the like. The GDI can handle data in the vector format and processes drawing data containing the data in the vector format. The processing result of the GDI can be output to both the display driver and the printer driver. The specialized graphics API processes, for example, drawing data that can be processed by a high-performance graphics accelerator. The processing result of the specialized graphics API can be output to the display driver, but is not output to the printer driver. Moreover, although the OS 53 contains various types of control software, such as a spooler system that manages a print job, a port monitor that outputs a printer command to a port, and the like, these technologies are well-known technologies, and therefore a detailed description thereof is omitted.

The printer driver 54 performs drawing processing as controlled by the print control unit 69 to create print data, and converts the print data to a printer command. Afterward, the printer command is transmitted to the printer 20 via the OS 53. Thus, the printer 20 performs printing onto a printing medium.

Next, an example of a GUI screen displayed on the display device 16 will be described using FIGS. 4 to 7A and 7B.

Figure 4:
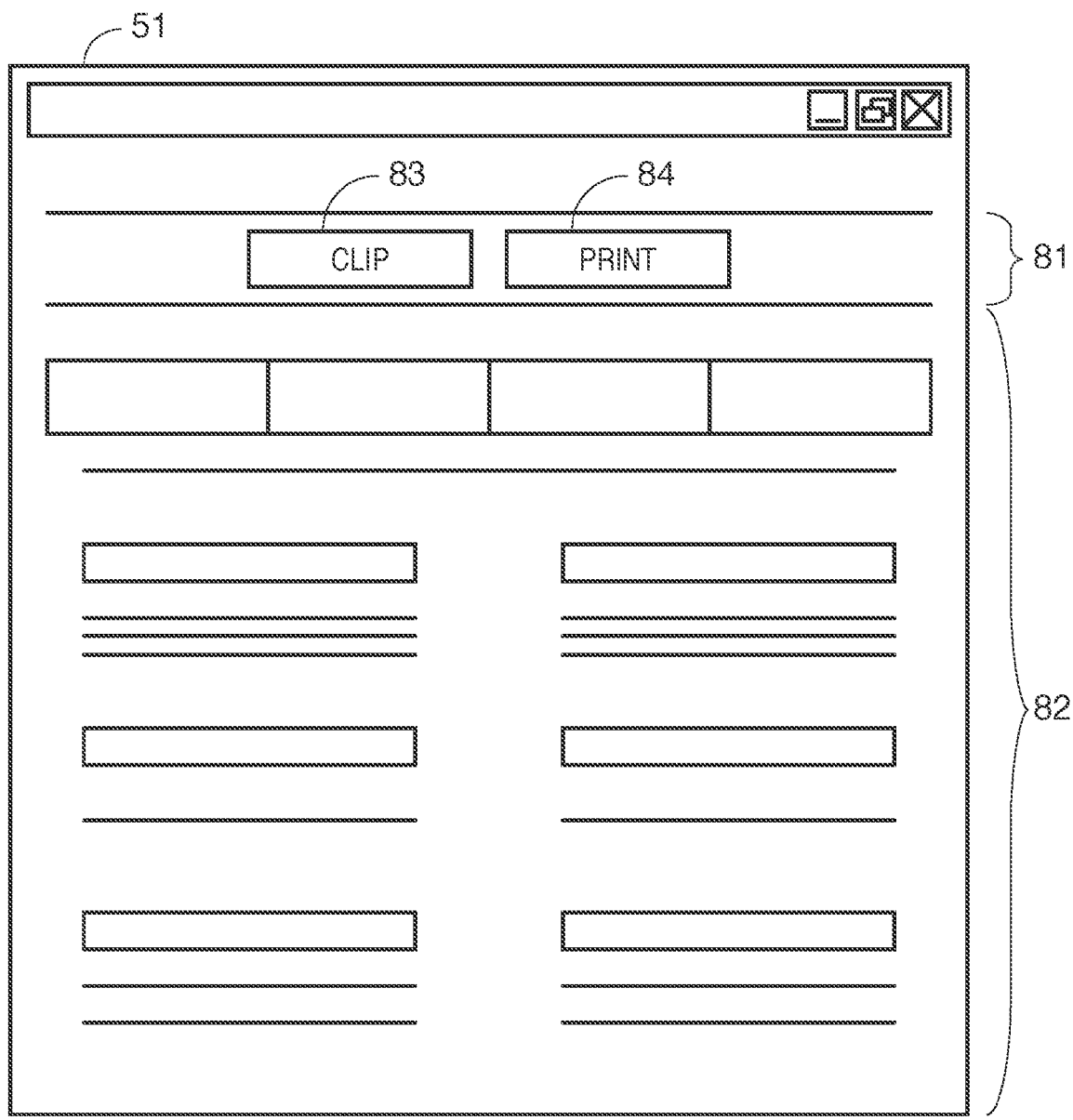
FIG. 4 is a diagram showing an example of a GUI screen displayed on a display device 16.

FIG. 4 shows an example in the case where a structured document that contains no moving image objects is displayed on the browser 51.

Here, a region 82 is a display region of the structured document. A region 81 is a GUI of a plug-in module executed by processing of the structured document printing module 52, and a "Clip" button 83 and a "Print" button 84 are arranged in this region. Once the structured document printing module 52 has been installed, a GUI such as this is incorporated into the browser 51.

Figure 5:
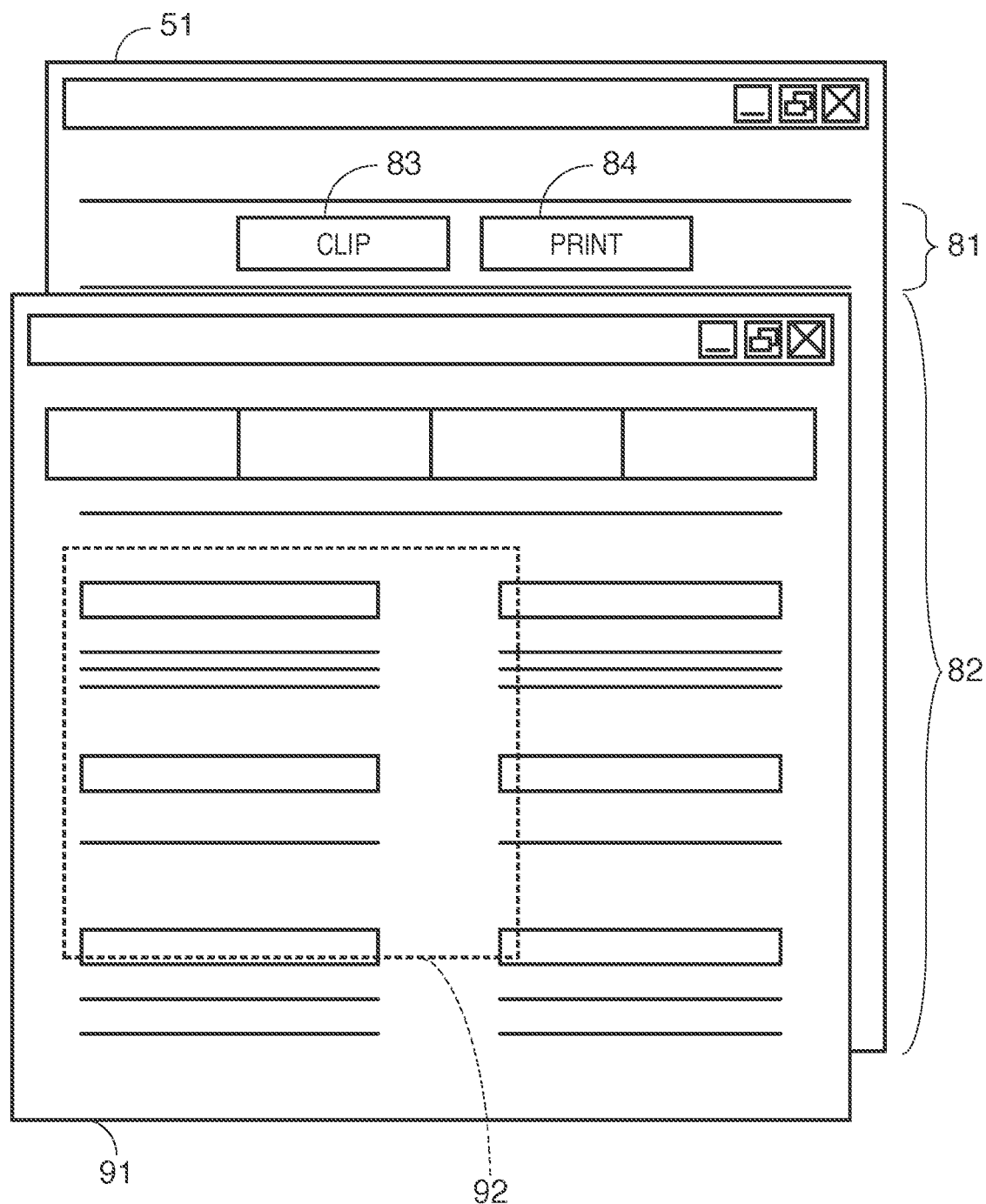
FIG. 5 is a diagram showing an example of the GUI screen displayed on the display device 16.

At the time of printing, the user presses the "Clip" button 83 via the mouse or the like. Then, as shown in FIG. 5, a child window 91 is displayed in front of the browser 51. In the child window 91, the drawing data of the structured document is displayed, and a selected region 92 is also displayed. The user can freely change the size or the location of the selected region 92 using the mouse or the like. It should be noted that although the child window 91 shown here is horizontally and vertically shifted with respect to the position of the display region 82 on the browser 51 for better understanding, the display position of the child window is not limited to this. For example, the child window 91 may be displayed at the same position as, and completely superposed on, the display region 82 on the browser 51.

Here, the user adjusts the selected region 92 on the child window 91 and determines a desired print range. Once the print range has been determined, the user presses the "Print" button 84 via the mouse or the like. Thus, printing of the range of the structured document selected by the selected region 92 can be performed.

Figure 6:
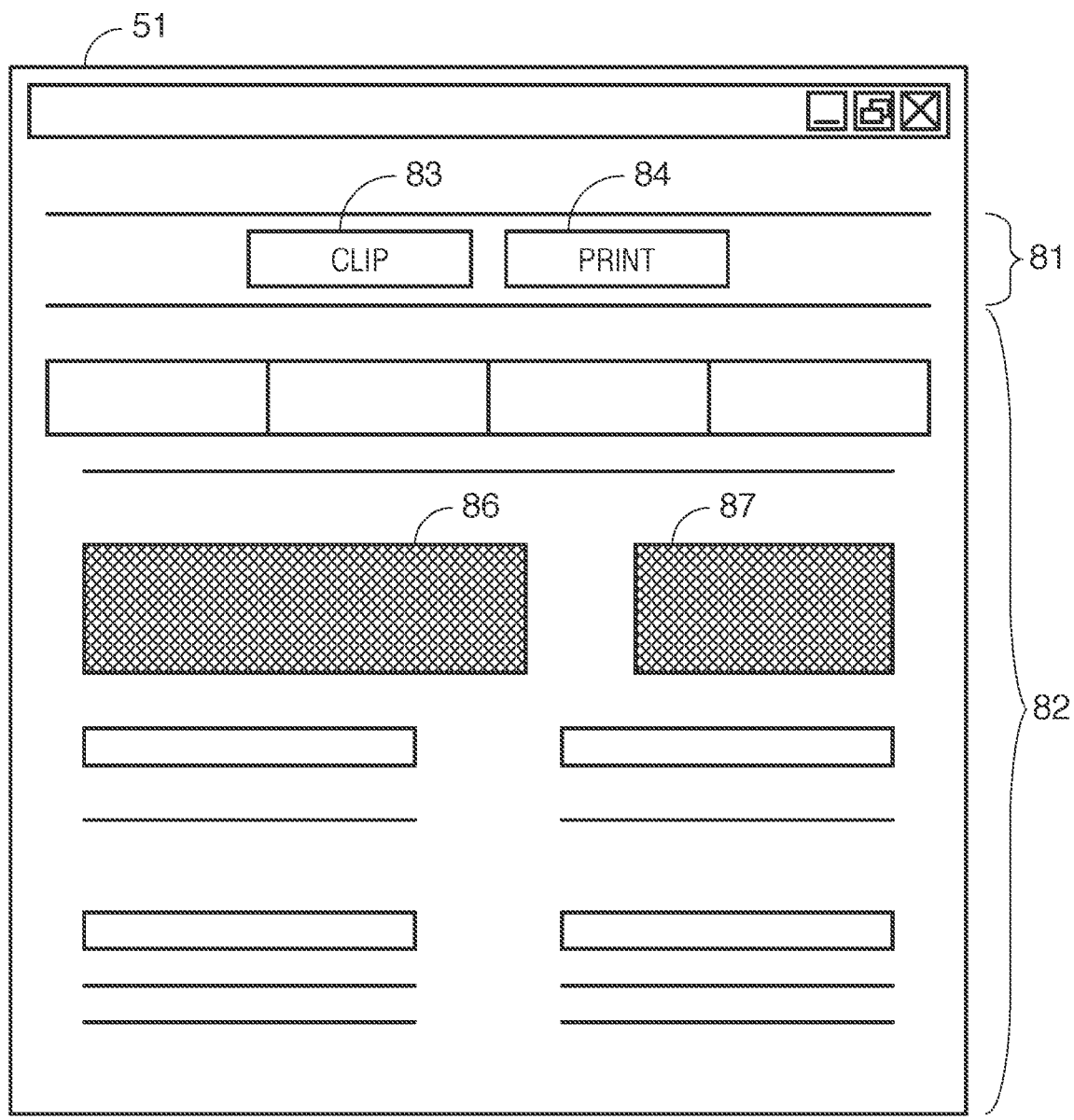
FIG. 6 is a diagram showing an example of the GUI screen displayed on the display device 16.

FIG. 6 shows an example in the case where a structured document that contains a moving image object is displayed on the browser 51. It should be noted that since the screen configuration is similar to that in FIGS. 4 and 5, a description thereof is omitted, and the differences will be focused on.

Here, reference numerals 86 and 87 respectively indicate moving image objects in the structured document. It is assumed that the moving image object 86 here is data whose drawing data can be generated in the vector format (data that can be captured in the vector format). Moreover, it is assumed that the moving image object 87 is data whose drawing data can only be generated in the raster format (data that cannot be captured in the vector format). The data whose drawing data can be generated in the vector format refers to data with respect to which, after drawing processing of the moving image object is performed via the GDI, the printer driver 54 can handle the drawing data to generate print data. The data whose drawing data can only be generated in the raster format refers to data with respect to which, after drawing processing of the moving image object is performed via the graphics API through which processing can be performed by the high-performance graphics accelerator, the printer driver 54 cannot receive the processing result in the vector format as is. This is because the drawing data of the latter moving image object is supplied to the display driver without passing through the GDI. Although details will be described later, the latter moving image object is changed to the raster format temporarily and then incorporated into the intermediate data. It should be noted that the raster format refers to data in, for example, bitmap format, png format, jpg format, or the like. Moreover, which of the above-described two different formats a moving image object contained in a web page corresponds to is determined depending on the type of moving image. The type of moving image can be determined by referencing tags indicated by a structured language contained in the web page to make the determination based on information indicating the type of operation or can be determined by an extension of a moving image file.

Figure 7A:
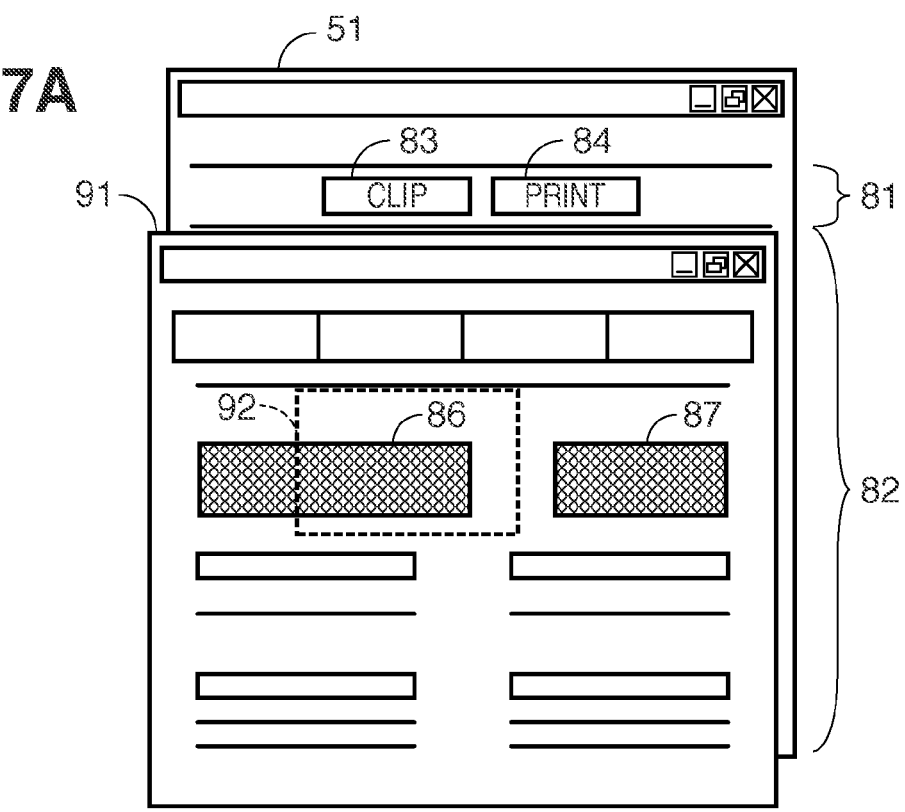
FIGS. 7A and 7B are diagrams showing an example of the GUI screen displayed on the display device 16.
Figure 7B:
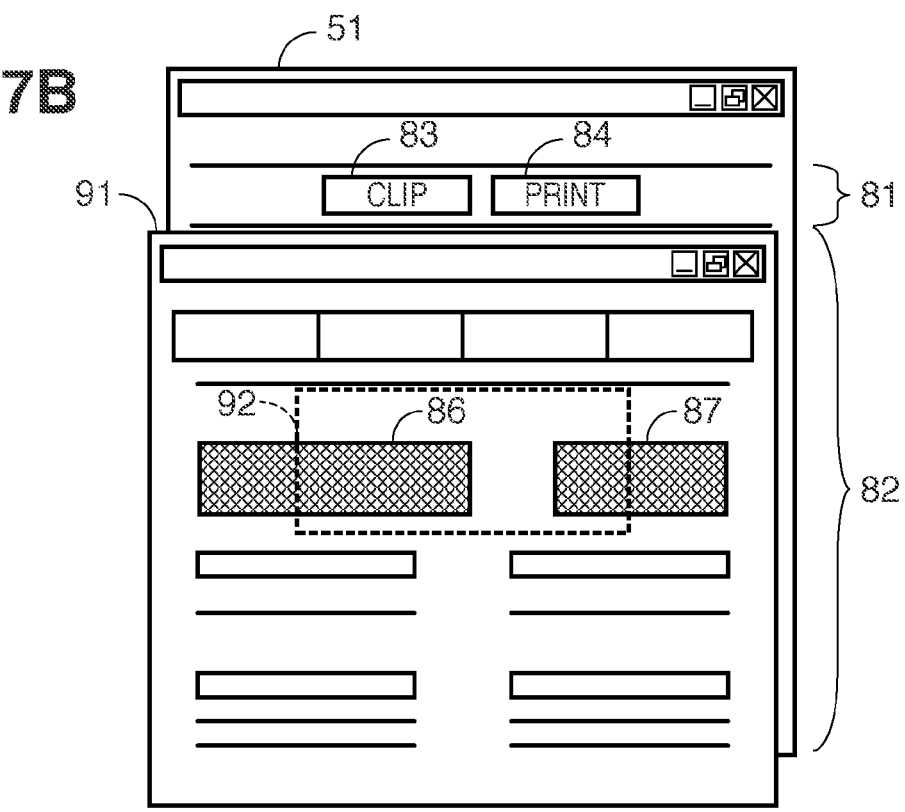

At the time of printing, the user presses the "Clip" button 83 via the mouse or the like. Then, as shown in FIGS. 7A and 7B, the child window 91 is displayed in front of the browser 51. In this child window 91, the drawing data of the structured document is displayed, and the selected region 92 also is displayed.

Here, only the moving image object 86 whose drawing data can be generated in the vector format is present in the selected region 92 shown in FIG. 7A. Therefore, with respect to a web page portion containing the moving image object in the selected region 92, the drawing data is entirely created in the vector format except a bitmap image object.

In contrast, the moving image object 86 whose drawing data can be generated in the vector format and the moving image object 87 whose drawing data can only be generated in the raster format are present in the selected region 92 shown in FIG. 7B. In this case, if drawing processing for acquiring data in the vector format is performed as is the case with FIG. 7A, a portion where the moving image object 87 is present will be missing, leaving a blank. Thus, here, for the moving image object 87, the drawing data is created in the raster format, and for the other region (the moving image object 87 and a region of the web page in which no moving image object is arranged), the drawing data is created in the vector format. Afterward, the drawing data created in the raster format is combined with (embedded into) the drawing data created in the vector format, and thus a single piece of drawing data is created.

Figure 8:
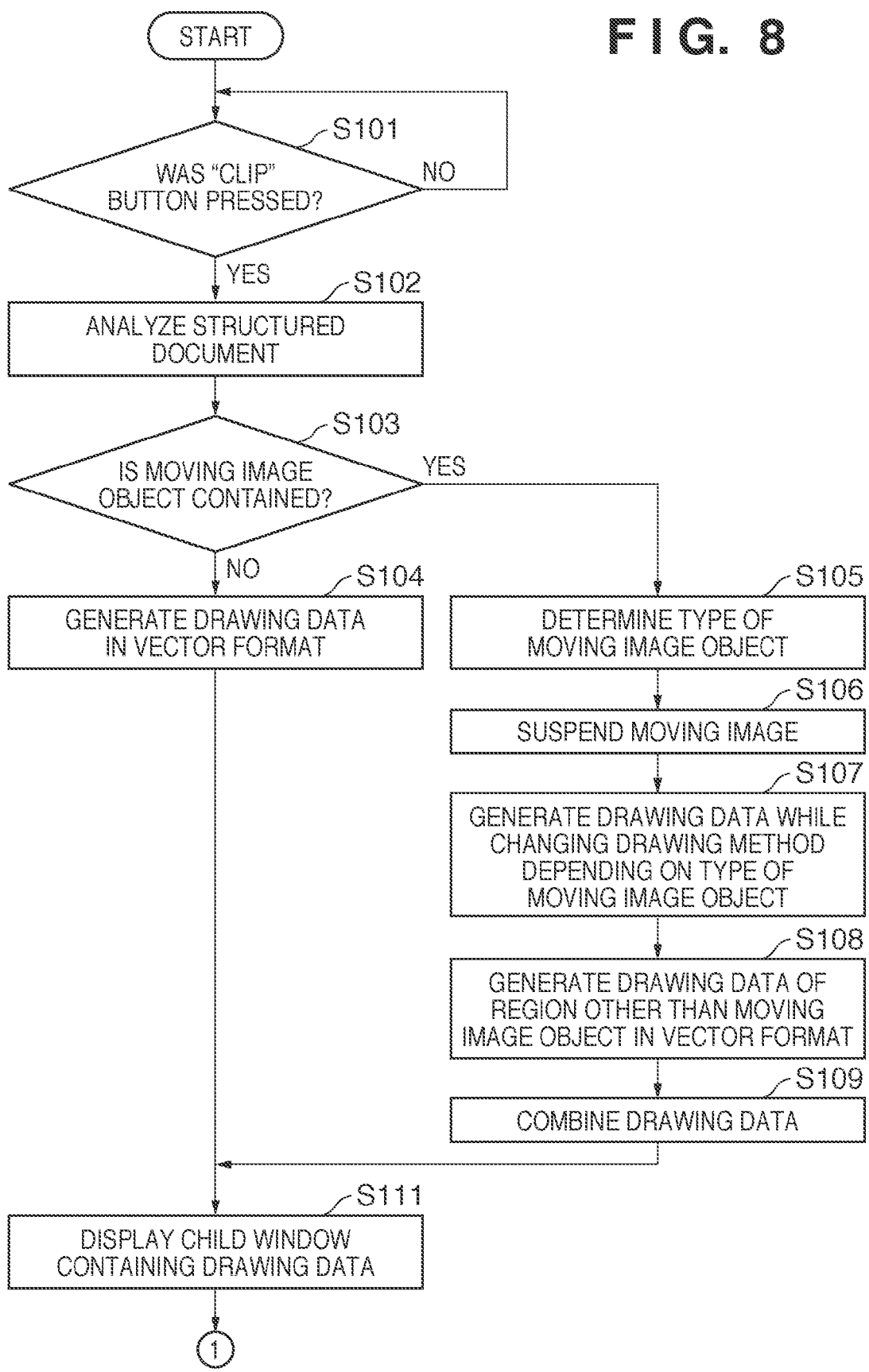
FIG. 8 is a flowchart illustrating an example of the flow of processing in the PC 10 shown in FIG. 1.

Next, an example of the flow of capturing processing and print processing in the PC 10 when printing a structured document will be described using FIGS. 8 and 9. Here, processing from creation of intermediate data in EMF format of a print region of the structured document to printing of the created intermediate data will be described. Processing of the flowcharts shown in FIGS. 8 and 9 is performed by the CPU 11 executing a program of the structured document printing module 52 stored in the hard disk 14.

This processing is started when the user presses the "Clip" button 83 on the browser 51 shown in FIG. 4 via the mouse or the like (YES in S101). Once this processing has started, the moving image detection unit 61a of the PC 10 analyzes the structured document displayed on the browser 51 and performs a detection (a first determination) of whether or not a moving image object is contained in the document of interest (S102).

If the result of the detection is that no moving image object has been detected (NO in S103), the structured document drawing unit 62 of the PC 10 generates the drawing data 71 in the vector format on the RAM 12 (S104). Then, the window generation unit 63 generates the child window 91 containing the generated drawing data 71, and the window display processing unit 66 displays the child window 91 on the display device 16 (S111).

On the other hand, if the result of the detection in S103 is that a moving image object has been detected (YES in S103), the type determination unit 61b of the PC 10 performs a determination (a second determination) of the type of each of the detected one or more moving image objects (S105). Then, playback (movement) of a moving image is suspended depending on the type determined (S106).

Once the playback of the moving image has been suspended, the structured document drawing unit 62 of the PC 10 generates drawing data from a still image of each moving image object in the suspended state while changing the drawing method depending on the type of each moving image object (S107). For example, in the case of the structured document shown in FIG. 6 above, drawing data in the vector format is generated for the moving image object 86, and drawing data in the raster format is generated for the moving image object 87. The structured document drawing unit 62 creates the drawing data 71 in the vector format for a region other than the moving image objects (a region that can be drawn in the vector format) (S108). At this time, if this region contains a bitmap image, the drawing data is created with the bitmap image portion remaining as is, that is, as the bitmap image.

Afterward, the structured document drawing unit 62 of the PC 10 combines the drawing data in the raster format or the vector format that has been generated by the processing in S107 with the drawing data that has been generated by the processing in S108 (S109). Then, the window generation unit 63 of the PC 10 generates the child window 91 containing the generated drawing data 71, and the window display processing unit 66 displays the child window 91 on the display device 16 (S111). It should be noted that the processing from S106 to S111 is repeatedly performed after the child window has been displayed until a print instruction is provided (until the "Print" button is pressed). That is to say, playback and (temporary) suspension of a moving image object is repeated at constant time intervals to create drawing data of frames (still images) of the moving image object that are displayed at points in time when the moving image object is suspended. The created drawing data is drawn on the child window.

It should be noted that the drawing data drawn on the child window in S111 contains all the objects within the web page. In the drawing data drawn on the child window, data except the drawing data of the bitmap image and the moving image object that cannot be captured in the vector format is data captured as data in the vector format. The drawing data created by processing in this S111 serves as captured data containing the data in the vector format.

Now, FIG. 9 will be described. The selected region display processing unit 67 of the PC 10 displays the selected region 92 on the child window 91 that contains the result of drawing processing performed in the processing of S104 or S109 (S112). As described above, the selected region 92 is a region that defines a range to be printed. It should be noted that in order to make it easy for the user to recognize the region, the color outside of the selected region 92 can be displayed in grayscale, for example.

Here, if a change in the range of the selected region 92 is instructed through an operation via the mouse or the like by the user (YES in S113), the selected region display processing unit 67 of the PC 10 changes the range of the selected region 92 based on the instruction and displays the changed range (S114). Moreover, if the "Print" button 84 is pressed through an operation via the mouse or the like by the user (YES in S115), the intermediate data generation unit 68 of the PC 10 creates the intermediate data 72 (S116). More specifically, coordinates corresponding to the selected region 92 are specified from the drawing data 71, data of a portion corresponding to the specified coordinates is retrieved, and the intermediate data 72 is created based on the retrieved data. It should be noted that even though the drawing data may be scaled at this time according to the size of a printing medium to be used in printing or the content of print settings, deterioration of the image quality of the portion in the vector format will be reduced.

Afterward, the print control unit 69 of the PC 10 instructs the OS 53 to print the intermediate data 72 on the printer 20. Then, the OS 53 invokes the printer driver 54 for the printer 20 and causes the printer driver 54 to convert the intermediate data 72 to a print command and spool the print command to the spooler of the OS 53. Then, the OS 53 transmits the print command to the printer 20 (S117). Thus, the printer 20 performs printing based on the intermediate data 72.

As described above, according to the present embodiment, when outputting a web page as data in the vector format, even if the web page contains a moving image object whose drawing data cannot be generated in the vector format, the moving image object is prevented from going missing. Moreover, according to the present embodiment, drawing data is generated while changing the drawing method depending on the type of moving image object in a structured document.

Thus, it is possible to output an image showing the moving image object contained in the web page irrespective of the type of the moving image object. Moreover, it is possible to select any desired region in the web page and print the selected region.

Moreover, although the foregoing description has assumed that the region to be printed is freely designated by the user, the region to be printed may be a predetermined fixed range or may be the full range. Furthermore, although a case where the above-described processing is performed by the plug-in module added to the browser 51 has been described in the foregoing description, this is not a limitation, and it is also possible that the browser 51 itself has an equivalent function.

Moreover, the same processing as the processing described above is applicable not only to a moving image object contained in a web page but also to moving image objects displayed in various types of applications.

Moreover, although a case of printing a content containing a moving image object has been described in the foregoing description, printing may be replaced by the following processing. That is to say, it is also possible to capture data in the vector format (excluding a bitmap image portion and a moving image portion that cannot be subjected to drawing processing in the vector format) and store the captured data in a hard disk or the like as a file. Moreover, at this time, it is also possible to convert the captured data to another format before storing it as a file.

Moreover, although a case where Windows (registered trademark) of Microsoft Corporation is used as the OS has been described in the foregoing description, this is not a limitation. For example, the present invention is also applicable to cases where various types of OSs are used, such as the case where Quartz of Mac OS of Apple Inc. in the U.S. is used instead of GDI of Windows (registered trademark).

Although an example of exemplary embodiments of the present invention has been described, the present invention is not limited to the embodiment described above and illustrated in the drawings, and modifications can be made as appropriate without departing from the gist of the invention.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the S of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable storage medium).

Moreover, this program may be executed by a single computer or may be executed by a plurality of computers operating in conjunction with each other. Furthermore, it is not necessarily required that the entire processing described above be realized by software, and the processing may be realized partly or entirely by hardware.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-162210 filed on Jul. 16, 2010, which is hereby incorporated by reference herein in its entirety.

What is claimed is:

1. An information processing apparatus comprising:
   a processor;
   a determination unit configured to determine whether a moving image object contained in a web page corresponds to a predetermined type whose drawing data is generated by using a generator in a vector format for being displayed by a display driver and not for being printed by a printer driver, according to a tag in a structured document corresponding to the web page or an extension of a moving image file corresponding to the moving image object;
   a generation unit configured to, in a case where the determination unit determines that the moving image object corresponds to the predetermined type, generate drawing data of the moving image object in a raster format without using the generator, for printing an image based on the web page by using the printer driver;
   a creation control unit configured to control creating of captured data, corresponding to the web page, including the drawing data generated by the generation unit;
   a designation unit configured to designate a predetermined region of the web page, according to a designation by a user for the captured data created by the creation control unit and displayed on a display device; and
   an output control unit configured to cause an outputting device to output the captured data based on the predetermined region designated by the designation unit.

2. The information processing apparatus according to claim 1,
   wherein the generation unit suspends a movement of a moving image of the moving image object and then generates the drawing data for a frame at a point in time when the movement is suspended.

3. The information processing apparatus according to claim 2,
   wherein the generation unit repeats movement and suspension of the moving image of the moving image object at predetermined time intervals and generates the drawing data for frames at points in time when the moving image is suspended, and
   the creation control unit updates the captured data of a moving image object portion based on the drawing data generated by the generation unit.

4. The information processing apparatus according to claim 1, wherein the output control unit outputs causes the outputting device to output captured data created by the creation control unit and corresponding to the region designated by the designation unit.

5. The information processing apparatus according to claim 4, further comprising:
   a display processing unit configured to cause the display device to display the captured data created by the creation control unit.

6. The information processing apparatus according to claim 5, wherein in a case where the designation unit designates the predetermined region corresponding to a part of the web page, the output control unit causes the outputting device to output the captured data corresponding to the part of the web page.

7. The information processing apparatus according to claim 6, wherein in a case where the designation unit designates the predetermined region corresponding to a part of a moving region, in the web page, which corresponds to the moving image object, the output control unit causes the outputting device to output the captured data corresponding to the part of the moving region.

8. The information processing apparatus according to claim 1, wherein the output control unit causes a printing device as the outputting device to output an image based on the captured data created by the creation control unit by using the printer driver so that the image can be printed onto a printing medium by the printing device.

9. The information processing apparatus according to claim 1, wherein the drawing data of the moving image object corresponding to the predetermined type is supplied to the display driver without passing through a graphic device interface.

10. The information processing apparatus according to claim 1, wherein in a case where the determination unit determines that the moving image object corresponds to the predetermined type and another object is contained in the web page, the generation unit is configured to generate first drawing data of said the other object and second drawing data of the moving image object without using the generator, and
the creation control unit is configured to control creating of captured data including the first drawing data and the second drawing data generated by the generation unit.

11. A processing method of an information processing apparatus that processes a web page, the method comprising the steps of:
determining whether a moving image object contained in a web page corresponds to a predetermined type whose drawing data is generated by using a generator in a vector format for being displayed by a display driver and not for being printed by the printer driver, according to a tag in a structured document corresponding to the web page or an extension of a moving image file corresponding to the moving image object;
generating drawing data of the moving image object, in a case where the determination unit determines that the moving image object corresponds to the predetermined type in a raster format without using the generator, for printing an image based on the web page using the printer driver;
creating captured data, corresponding to the web page, including the generated drawing data
designating a predetermined region of the web page, according to a designation by a user for the captured data displayed on a display device; and
causing an outputting device to output the created captured data based on the predetermined region.

12. The method according to claim 11, wherein in the generating of the drawing data, a movement of a moving image of the moving image object is suspended, and then the drawing data for a frame at a point in time when the movement is suspended are generated.

13. The method according to claim 12,
wherein in the generating of the drawing data, movement and suspension of the moving image of the moving image object at predetermined time intervals are repeated, and the drawing data for frames at points in time when the moving image is suspended are generated, and
in the creating step, the captured data of a moving image object portion are updated, based on the generated drawing data when the moving image is suspended.

14. The method according to claim 11, further comprising the steps of:
determining whether a type of a moving image object is in a format that allows drawing data of the moving image object to be captured in the vector format,
wherein in the generating of the drawing data drawing data are generated in the raster format, with respect to a moving image object that has been determined in the determining step as not being in the format that allows drawing data of the moving image object to be captured in the vector format, and
wherein in the generating of the drawing data drawing data are generated in the vector format, with respect to a moving image object that has been determined in the determining step as being in the format that allows drawing data of the moving image object to be captured in the vector format.

15. The method according to claim 11, wherein, in the causing step, captured data created in the creating step and corresponding to the region designated in the designating step, are output by the outputting device.

16. The method according to claim 15, further comprising the step of:
causing the display device to display the captured data created in the creating step.

17. The method according to claim 16, wherein in a case where, in the designating step, the predetermined region corresponding to a part of the web page is designated, the outputting device outputs the captured data corresponding to the part of the web page, in the causing step.

18. The method according to claim 17, wherein in a case where, in the designating step, the predetermined region is designated, corresponding to a part of a moving region, in the web page, which corresponds to the moving image object, the outputting device outputs the captured data corresponding to the part of the moving region, in the causing step.

19. The method according to claim 11,
wherein in the causing step, an image based on the captured data created in the creating is output by the outputting device so that the image can be printed onto a printing medium by the printing device.

20. The information processing apparatus according to claim 1, wherein in a case where the determination unit determines the moving image object does not correspond to the predetermined type, the generation unit generates the drawing data of the moving image object in the vector format without using the generator.

21. The method according to claim 11, wherein in a case where it is determined, in the determining step, that the moving image object does not correspond to the predetermined type, the drawing data of the moving image object is generated in the vector format without using the generator, in the generating step.

22. The method according to claim 11, wherein the drawing data of the moving image object corresponding to the predetermined type is supplied to the display driver without passing through a graphic device interface.

23. The method according to claim 11, wherein in a case where it is determined, in the determining step, that the moving image object corresponds to the predetermined type and another object is contained in the web page, in the generating step, first drawing data of the other object and second drawing data of the moving image object are generated without using the generator, and
in the creating step, the captured data includes the first drawing data and the second drawing data which are generated in the generating step.

24. A non-transitory computer-readable storage medium storing a computer program configured to cause a computer to execute the processing method according to claim 11.

25. The storage medium according to claim 24, wherein the computer program is a plug-in software for the web browser.

* * * * *